Oct. 3, 1961 E. M. WARD 3,002,460
AIR INJECTOR DEVICE FOR PRESSURE WATER SYSTEM
Filed Aug. 8, 1956 2 Sheets-Sheet 1

INVENTOR.
EARL M. WARD
BY
ATTORNEY

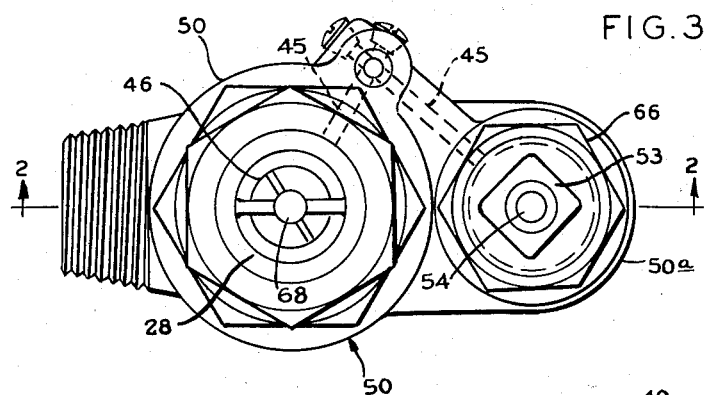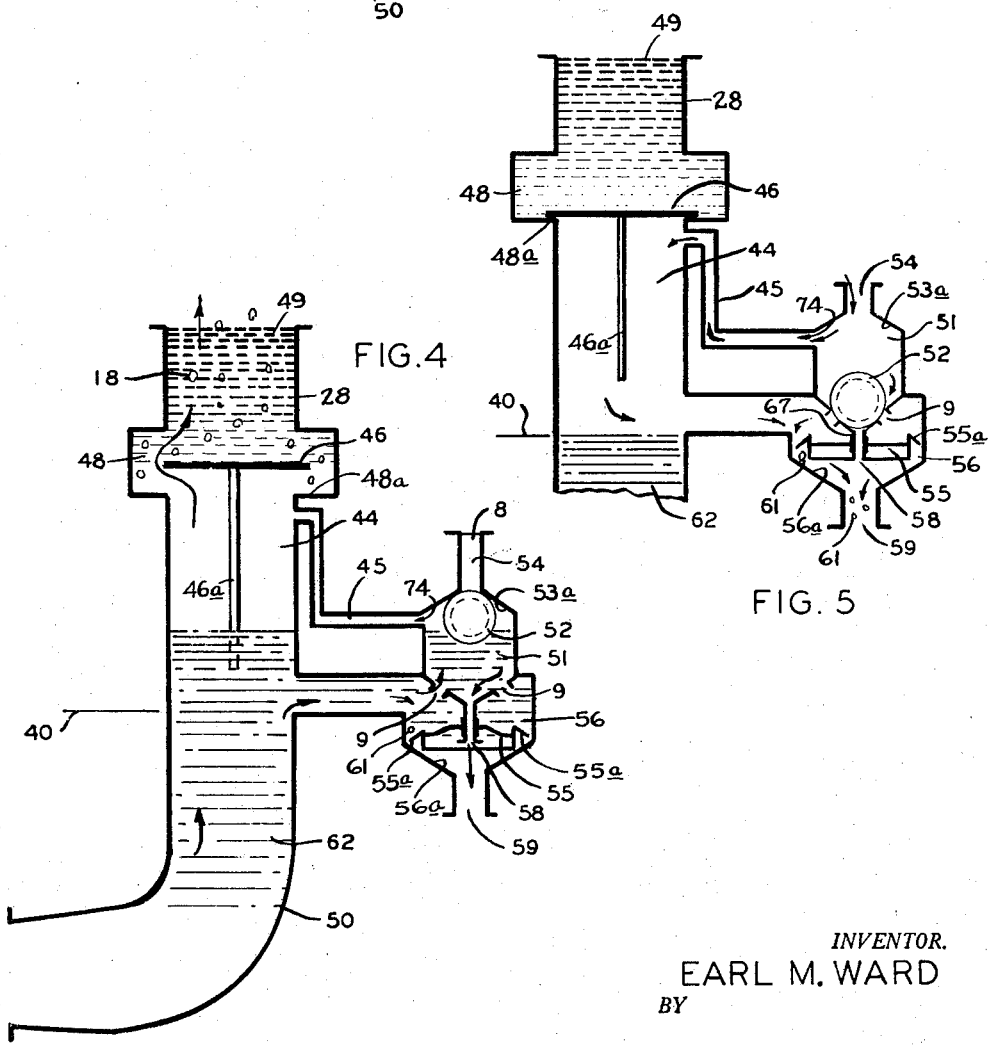

United States Patent Office 3,002,460
Patented Oct. 3, 1961

3,002,460
AIR INJECTOR DEVICE FOR PRESSURE WATER SYSTEM
Earl M. Ward, Rte. 1, Box 146, Calistoga, Calif.
Filed Aug. 8, 1956, Ser. No. 602,715
3 Claims. (Cl. 103—6)

My present invention relates to an air injection device principally adapted to use with conventional private home and commercial pressure water systems operating on a power-on and power-off cycle, with an unaerated well as the water supply source.

These water systems do not have a separate air compression means as do the large continuously operating type for maintaining the air cushion volume; therefore, they are subjected to loss of air cushion volume by reason of absorption of air by the fresh water from the unaerated well.

The loss of air to the water is a source of trouble to these systems, in that the air cushion which is intended to maintain a constant cushion of pressure, gradually reduces in volume by being slowly absorbed into the water. The reduction of air cushion volume causes the pumping time to become shorter and consequently less water is pumped during the power-on period of the pumping cycle.

The air cushion can become so small in volume, that the pumping operation resolves itself into continuous start and stop operation of the pump, with the pumping periods as short as two seconds of time.

The basic object of my invention is to supply a measured quantity of air to the air cushion at each operation of the pump, so as to compensate for air cushion loss by absorption by the water. Thus an adequate compressed air cushion will always be maintained to assure pressure out flow of water from the tank.

Another object of my invention is to provide an improved means of balancing the intermittent losses of air cushion by intermittent injections of atmospheric air.

A further object of my invention is to provide a simple means for displacing a measured quantity of water from the hydrostatic column of water leading from the well and replacing it with an equal quantity of air.

A still further object of my invention is to provide a means for confining the water-replacing quantity of air so that it can be injected into the water system.

A more specific purpose of my invention is to provide a novel valve means for controlling the injection of air into the water line to a service tank.

A still further purpose of my invention is to provide a novel valve which will eject particles of sand or gravel which may concentrate therearound, so as to make the device self-cleaning.

To more fully describe my invention, I make reference to the accompanying drawings which illustrate a now preferred embodiment of the invention.

In the drawings—

FIG. 3 is a top plan view of the air supply unit detached from the tank supply pipe;

FIG. 4 is a diagrammatic view of the unit of FIGS. 2 and 3 just after the pump has started and illustrating the valve positions during the supply of air to the tank supply line;

FIG. 5 is a diagrammatic view of the air supply unit of FIGS. 2 and 3 with the valves in the position they occupy before the pump starts.

Figure 1:
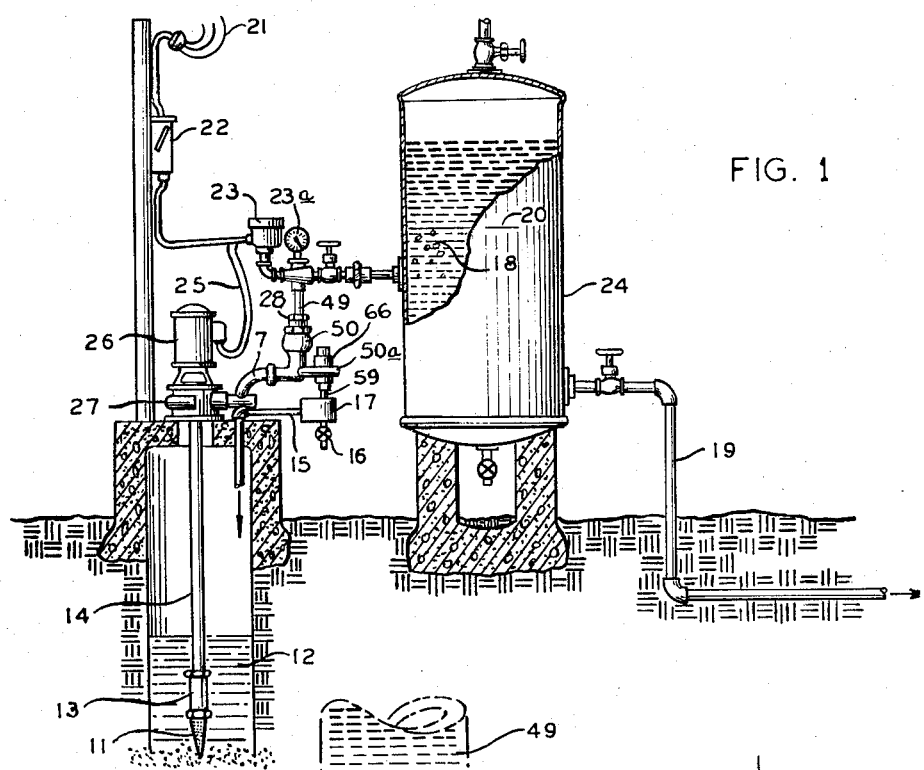
FIG. 1 is a largely diagrammatic elevation partly broken, of a pump and tank-incorporating water system embodying my invention.

Referring to the drawings by reference characters, it will be seen that my novel air injection unit 50 is incorporated in a conventional water supply system including an air tight tank 24 supplied by a fluid line 49, etc., there being the usual service line connection 19 adjacent the tank bottom.

A pump 27 driven by motor 26 supplies water to tank 24 from pipe 14 in well 12 through pipe connection 7, my novel air injection unit 50 and the aforementioned line 49. The well pipe 14 has the usual check valve 13 adjacent its lower end, which latter carries the preferably conical sand and foreign matter excluding screen 11.

Electrical current for the motor 26 is supplied from lines 21 in which is the usual control box 22 and pressure controlled switch 23, from which latter leads the electrical connection 25 to the motor. The pressure controlled switch 23 is conventional, and along with the pressure gauge 23a, is incorporated, as usual, in the fluid supply line 49 from pump 27 to tank 24.

As will be understood, the water supplied under pressure to the tank 24 from pump 27 compresses entrapped air in the upper part of the tank 24 so that water under pressure will be supplied to service line 19. As usual pressure switch 23 is set to start the pump-driving motor 26 when tank pressure drops to a predetermined low limit of say twenty pounds per square inch (hereinafter designated as p.s.i.) and to start it when such tank pressure reaches a predetermined high limit, of say forty p.s.i. The standard pressure switch 23 is adjustable so that opening and closing of the circuit to motor 26 can be effected at different predetermined pressures.

Figure 2:
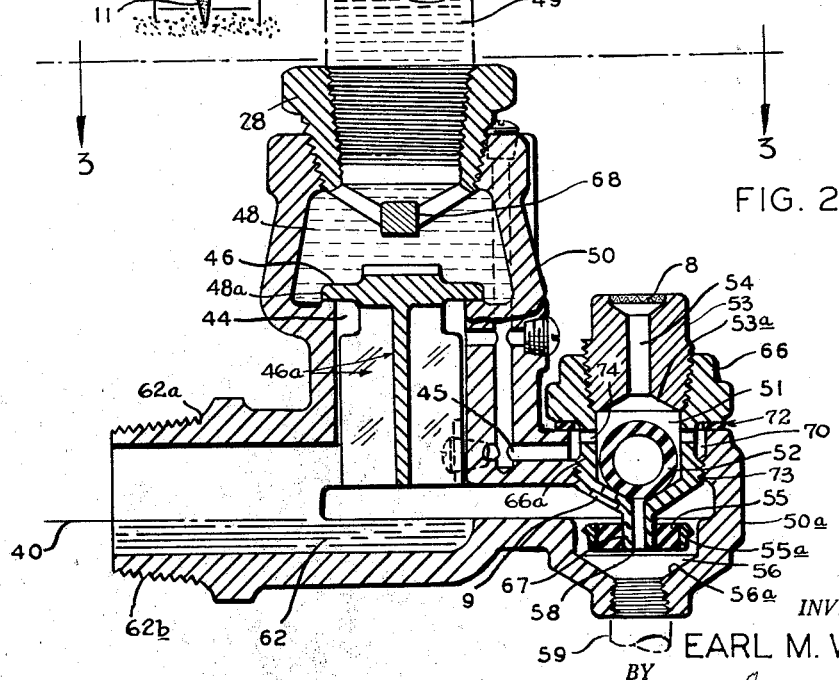
FIG. 2 is a sectional view through the air supply unit of FIG. 3, taken on line 2—2 of FIG. 3.

Coming now to my novel air injection unit 50 and turning to FIGS. 2 and 3, same is seen to comprise a casing having a lateral pipe extension 62a providing not only the fluid inlet to the casing, but also a portion of a main fluid-receiving chamber 62, which latter is substantially coextensive in width and length with casing 50, as viewed in FIG. 3. Pipe extension 62a is exteriorly threaded as at 62b for connection in supply line fitting 7 from pump 27 as shown in FIG. 1. The fluid outlet from casing 50 and main chamber 62 is by way of the communicating and upwardly extending air compressing chamber 44, the superjacent valve chamber 48 and the fitting 28 which is threaded into the upper end of valve chamber 48. Fitting 28 has threaded connection with fluid line 49, as shown. Fitting 28 also provides the spider arm-carried stop 68 for presently to be described pressure-controlled valve 46 in chamber 48.

Working in the valve chamber 48, which is diametrically larger than the subjacent air compressing chamber 44, is the pressure-controlled valve 46 having the depending guide wings 46a which extend into chamber 44. The lower end of valve chamber 48 has the seat 48a with which valve 46 engages under tank pressure from line 49 when pump 27 is not operating. As will be appreciated, the fitting 28 carried stop 68 intercepts valve 46 to admit of fluid flowing to tank 24 through line 49 when the pump 27 is in operation.

*The means for supplying air to chamber 44*

Referring to FIGS. 2 and 3, it is seen that the lower main chamber (62) providing portion of unit 50 has the extension 50a at its end which is remote from the threaded fluid inlet pipe portion 62a. This extension 50a, as will be noted, provides a portion of the main chamber 62, and projects beyond the upstanding part of said unit which provides the air and valve chambers 44, 48, respectively.

The lateral projection 50a of unit 50 has a circular hole 70 in its top through which is projected the valve chamber (51) providing lower portion 66a of the fitting 66. Fitting 66 has a nut-form outer portion which provides the lower end shoulder that bears on the gasket 72 which surrounds the hole 70.

An inner portion of the hole 70 above main chamber 62 has threaded engagement 73 with the valve chamber-defining part 66a of fitting 66 as shown in FIG. 2. The part 66a provides the chamber 51 for the free ball valve 52. Also, as will be noted, the lower end of 66a which extends into main chamber 62 tapers inwardly as at 66b to the central bleed passage 58 which extends through the depending stem 67. This stem 67 extends into the well-form valve chamber 56 and concentrically and fixedly carries the normally open and elastically flexible disk-form valve 55 having the stiffer annular rim portion 55a which tapers axially downwardly as shown in FIG. 2. The lower part of valve chamber 56 tapers inwardly to provide the valve seat 56a which surrounds the threaded outlet which carries drain pipe 59. The rim 55a of valve 55 when under pressure from above engages seat 56a.

FIG. 1 shows that the drain pipe 59 leads to a sand-collecting container 17 having a valve controlled drain 16; and also that there is a fluid drain line 15 discharging from sand container 17 into the well 12.

Referring to FIG. 2 and to the ball valve chamber-providing portion 66a of fitting 66, it will be noted that it provides transverse apertures 74 opening into a surrounding annular space below the plane of gasket 72 above main chamber 62. Also to be observed is the fact that a duct 45 leads from said annular space to establish communication between ball valve chamber 51 and the air compressing chamber 44.

FIGS. 2, 4 and 5 show that preferably screened holes 9, in the inwardly tapering lower part of 66b of fitting 66, establish communication between ball valve chamber 51 and the subjacent main fluid entry chamber 62.

Still referring to FIG. 2, it is also emphasized that main fluid entry chamber 62 is reduced in depth adjacent the entry to the well-form chamber 56 for valve 55. The reason for this is to assure that there will always be water in main chamber 62 when the pump 27 is not operating as in the FIGS. 2 and 5 showings.

As seen in FIG. 2, a plug 53 threaded into the open upper end of fitting 66 provides the open topped and axially extending air inlet passage 54 extending therethrough, the inner end of said passage communicating through the valve seat 53a. This seat 53a is engaged by ball valve 52 to cut off entry of air to chamber 51 when the pump 27 is operating. The upper, or air entry, end of duct 54 is preferably outwardly flared to accommodate a screen 8, as shown.

Even with the use of a screen 11 (FIG. 1) at the inlet end of well pipe 14 and over the holes 9 in 66b (FIG. 2), sand or gravel particles such as 61 somehow get into the system and collect on the valve 55 to get between its margin 55a and the wall of chamber 56 when the valve 55 is seated, as suggested in FIG. 4. However, such particles 21 are subsequently flushed out through pipe 59 as will be presently explained to prevent improper seating of valve 55 against seat 56.

*Operation described*

When the pump 29 is not in operation the valves 46, 52 and 55 are in the positions shown in FIGS. 2 and 5.

Thus, referring to FIG. 2, valve 46 is closed by tank pressure through 49 to close the outlet end of air chamber 44. Ball valve 52 is supported by 66b out of engagement with the superjacent seat 53 to admit air into air chamber 44 by way of 54, 51 and 74.

Any water in air chamber 44 and in main chamber 62 from the prior pumping period down to level 40 (FIG. 2), has previously drained out past the open drainage valve 55. Water from ball valve chamber 51 has drained out through holes 9 (FIGS. 2, 4 and 5) and bleed passage 58.

Thus, as seen in FIGS. 2 and 5, there is air in air chamber 44 and in the upper part of main chamber 62 when pump 27 is not in operation.

When tank pressure drops below a predetermined degree and the pump 27 is started as in FIG 4, pump pressure overcomes tank pressure so that valve 46 is unseated and valves 52 and 55 are seated. This means that ball valve cuts off air entry from duct 54; that the lower part of the margin 55a of valve 55 seating against 56a cuts off water drainage through 59; and that the charge of air (see bubbles 18 in FIG. 4) is forced into tank 24.

Referring to FIGS. 2, 4 and 5, if when valve 55 is seated as in FIG. 4 a particle 61 which is too large to pass through the space between valve edge 55a and the opposed portion of the wall of valve chamber 56 when valve 55 is open as in FIGS. 2 and 5, rests on said beveled valve edge 55a, the latter will cause such particle 61 to lay against the opposed wall of the valve chamber 56. Thus, when the pump is stopped and as the valve 55 returns to its normally open position of FIGS. 2 and 5, the gravel particle 61 is pinched by the beveled valve edge 55a against the opposed wall of valve chamber 56. Since the main body of valve 55 is of resilient flexible material this particle 61 pinching results in a slight bodily shift of valve 55 in the opposite direction to admit of particle 61 dropping out through the lower part of valve chamber 56 to outlet 59, as indicated in FIG. 5 to the sand trap 17. Thus the action of drainage valve 55 ejects sand and gravel particles 61 which might easily render the system inoperative.

It should be stated that with the use of my air injector unit, the air pressure drop in tank 24 which is necessary to cause pressure switch 23 to start the pump motor will occur when the tank water level is at 20 (FIG. 1). Also to be noted is the fact that fluid pressure relief through passage 58 enables drain valve 55 to open after the pump has stopped.

From the foregoing, it will be apparent that I have provided a water system, or an attachment for one, which will automatically supply needed auxilliary air to avoid unnecessarily frequent pump operation due to air absorption by the water. Also inefficient operation or shut downs due to valve clogging by sand is eliminated.

Having thus described my invention, what I claim is:

1. In a water supply system comprising an air tight tank having a fluid inlet and a fluid outlet, which latter is adjacent the tank bottom, a pump for supplying water to the tank inlet from a well or other supply source, a fluid supply conduit connecting said pump with said tank inlet whereby water supplied to the tank will compress entrapped air in the upper part of the tank, there being tank air pressure controlled means for starting the pump when tank pressure drops to a predetermined degree and for stopping the pump when it has been raised to a predetermined degree; the combination of an auxiliary air-supply unit incorporated as an element of said fluid supply conduit to supply a measured quantity of air to the tank during each period of operation of the pump, said unit comprising a casing providing a main horizontally disposed fluid-receiving chamber having a bottom, main chamber inlet and outlet portions provided by said casing and connected to said fluid supply conduit, said inlet portion located adjacent one main chamber end and its bottom and said outlet portion rising from an intermediate main chamber portion, said main chamber bottom providing a raised portion adjacent its second end and having a drainage outlet extending therethrough so that there will always be water in the main chamber when the pump is not running, a valve seat in said drainage outlet below the plane of said raised main chamber bottom portion, a normally open pump pressure closed drainage control value in said drainage outlet and movable to engage said seat, at least the central and major portion of said drainage control valve comprising an elastically flexible disk member, the fluid outlet from said main chamber providing an air storage chamber and a superjacent valve chamber, a valve seat between said air storage and valve chambers, an outwardly opening fluid pressure-controlled valve in said valve chamber and movable inwardly by tank pressure to engage said seat, said casing providing a top opening communicating with said main chamber and aligned with the drainage outlet therefrom, a valve cage removably secured in said top opening and providing a secondary chamber for said unit located in a plane below the valve seat in said main chamber outlet portion, the lower portion of said valve cage-provided secondary chamber having communication with said main chamber and providing an air inlet in its upper portion, a valve seat in said secondary chamber and surrounding said air inlet, a fluid level controlled valve in said cage-provided secondary chamber and movable to close said air inlet when the pump is in operation, said casing providing a passage communicating between the upper portion of said secondary chamber and said air storage chamber for supplying air to the latter when the pump is not in operation and the air inlet control valve is unseated, a stem depending from said cage and operatively supporting said drainage outlet closing valve, the stem extending through said valve, and said stem having a bleed passage communicating with said drainage outlet from said cage-provided secondary chamber.

2. In a water supply system comprising an air tight tank having a fluid inlet and a fluid outlet, which latter is adjacent the tank bottom, a pump for supplying water to the tank inlet from a well or other supply source, a fluid supply conduit connecting said pump with said tank inlet whereby water supplied to the tank will compress entrapped air in the upper part of the tank, there being tank air pressure controlled means for starting the pump when tank pressure drops to a predetermined degree and for stopping the pump when it has been raised to a predetermined degree; the combination of an auxiliary air-supply unit incorporated as an element of said fluid supply conduit to supply a measured quantity of air to the tank during each period of operation of the pump, said unit comprising a casing providing a main horizontally disposed fluid-receiving chamber having a bottom, main chamber inlet and outlet portions provided by said casing and connected to said fluid supply conduit, said inlet portion located adjacent one main chamber end and its bottom and said outlet portion rising from an intermediate main chamber portion, said main chamber bottom providing a raised portion adjacent its second end and having a drainage outlet extending therethrough so that there will always be water in the main chamber when the pump is not running, a valve seat in said drainage outlet below the plane of said raised main chamber bottom portion, a normally open pump pressure-closed control valve in said drainage outlet and movable to engage said seat, the fluid outlet from said main chamber providing an air storage chamber and a superjacent valve chamber, a valve seat between said air storage and valve chambers, an outwardly opening fluid pressure-controlled valve in said valve chamber and movable inwardly by tank pressure to engage said seat, said casing providing a secondary chamber above said main chamber but located below the plane of the valve seat in said main chamber outlet portion, said secondary chamber being aligned with the drainage outlet and having a valve seat-providing air inlet in its upper portion, the lower portion of said secondary chamber communicating with said main chamber and there being a bleed passage communicating from said secondary chamber to said drainage outlet below its valve seat, a fluid controlled valve in said secondary chamber and movable to close said air inlet when said pump is in operation, said casing providing a passage communicating between the upper portion of said secondary chamber and said air storage chamber for supplying air to the latter when the pump is not in operation and the air inlet control valve is unseated, said drainage outlet from said main chamber providing an upstanding wall spacedly surrounding said drainage control valve in both its seated and unseated positions, said drainage valve comprising a flexible elastic central major portion and a surrounding outer rim for engagement with the valve seat, fixed casing-provided means secured to the elastic central drainage valve portion and spaced from the outer edges of the latter so as to admit of valve seat enagement by said rim portion under pump-generated fluid pressure, and the top of said outer valve rim being axially and downwardly bevelled to its outer edge whereby a gravel particle or the like resting on said bevelled edge and against the surrounding drainage outlet wall when the valve is seated will be pinched therebetween as the valve unseats so as to actuate the drainage valve bodily laterally and result in the dropping of said particle out through the subjacent valve seat.

3. The structure of claim 2, and said casing providing an opening above said drainage outlet, a valve cage removably secured in said casing opening and constituting said secondary chamber, said casing-carried drainage valve supporting means comprising a fixed stem depending from said valve cage; and said bleed passage extending through said stem.

References Cited in the file of this patent
UNITED STATES PATENTS

| | | |
|---|---|---|
| 1,749,877 | Fisher | Mar. 11, 1930 |
| 1,898,337 | Brooks | Feb. 21, 1933 |
| 2,303,627 | Fuller | Dec. 1, 1942 |
| 2,503,376 | Burgess | Apr. 11, 1950 |
| 2,520,794 | Brady | Aug. 29, 1950 |
| 2,621,597 | Armstrong et al. | Dec. 16, 1952 |
| 2,807,214 | Patterson | Sept. 24, 1957 |